United States Patent
Cheng et al.

(10) Patent No.: US 8,542,650 B2
(45) Date of Patent: Sep. 24, 2013

(54) METHODS AND SYSTEMS FOR CONCURRENT DATA AND SIGNALING METHODOLOGY FOR WIMAX HANDOVER

(75) Inventors: Steven D. Cheng, San Diego, CA (US); Ayman Naguib, Cupertino, CA (US); Doo Seok Kim, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 677 days.

(21) Appl. No.: 12/511,020

(22) Filed: Jul. 28, 2009

(65) Prior Publication Data

US 2010/0020765 A1    Jan. 28, 2010

Related U.S. Application Data

(60) Provisional application No. 61/084,179, filed on Jul. 28, 2008.

(51) Int. Cl.
*H04W 36/18* (2009.01)

(52) U.S. Cl.
USPC ............ 370/331; 370/310.2; 455/422.1; 455/432.1; 455/437; 455/442

(58) Field of Classification Search
USPC .......... 370/310.2, 328–339, 349; 455/422.1, 455/432.1, 436–444
See application file for complete search history.

(56) References Cited

U.S. PATENT DOCUMENTS

| | | | |
|---|---|---|---|
| 2002/0045451 A1* | 4/2002 | Hwang et al. | 455/442 |
| 2005/0239465 A1 | 10/2005 | Lee et al. | |
| 2006/0229075 A1* | 10/2006 | Kim et al. | 455/436 |
| 2007/0058524 A1* | 3/2007 | Modlin et al. | 370/208 |
| 2007/0237103 A1 | 10/2007 | Reynolds et al. | |
| 2008/0170535 A1 | 7/2008 | Zheng | |
| 2009/0040983 A1 | 2/2009 | Kim et al. | |
| 2009/0042572 A1* | 2/2009 | Craig et al. | 455/436 |
| 2009/0059857 A1 | 3/2009 | Kim et al. | |
| 2009/0059885 A1 | 3/2009 | Sadek et al. | |

FOREIGN PATENT DOCUMENTS

WO    WO2006/130063 A1 * 12/2006

OTHER PUBLICATIONS

IEEE Standard for Local and metropolitan area networks—Part 16: Air Interface for Fixed and Mobile Broadband Wireless Access Systems—Amendment 2: Physical and Medium Access Control Layers for Combined Fixed and Mobile Operation in Licensed Bands and Corrigendum 1—IEEE Std 802.16e-2005, Feb. 28, 2006, IEEE.*
IEEE Standard for Local and metropolitan area networks—Part 16: Air Interface for Fixed and Mobile Broadband Wireless Access Systems—IEEE Std 802.16/2004, Oct. 1, 2004, IEEE.*
Lee et al., OFDM-Based Semi-Soft Handover for High Data Rate Services, Sep. 3-7, 2007, IEEE.*

(Continued)

*Primary Examiner* — Hoon J Chung
(74) *Attorney, Agent, or Firm* — Charles Chesney (57) ABSTRACT

Techniques, systems and methods for concurrent data and signaling for WiMAX handover are disclosed herein. The serving base station may receive a handover request message from a mobile station and transmit a parameter to the mobile station to indicate a time to suspend a first set of one or more service flows between the serving base station and the mobile station during a handover procedure and continue data exchange between the mobile station and the serving base station for a second set of one or more service flows during the handover procedure. The proposed techniques reduce the service suspension time during the handover procedure.

28 Claims, 8 Drawing Sheets

(56) References Cited

OTHER PUBLICATIONS

Chang et al., A Fractional Soft Handover Scheme for 3GPP LTE-Advanced System, Jun. 14-18, 2009, IEEE.*

Tomasz Mrugalski et al., "How to Improve the Efficiency of IPv6 Handovers in IEEE 802.16 Networks", Australasian Telecommunication Networks and Applications Conference, 2008, pp. 282-287, Dec. 7-10, 2008.

* cited by examiner

METHODS AND SYSTEMS FOR CONCURRENT DATA AND SIGNALING METHODOLOGY FOR WIMAX HANDOVER

CLAIM OF PRIORITY

This application claims benefit priority from U.S. Provisional Patent Application Ser. No. 61/084,179, entitled "Methods and Systems for Concurrent Data and Signaling Methodology for WIMAX Handover" and filed Jul. 28, 2008, which is assigned to the assignee of this application and is fully incorporated herein by reference for all purposes.

TECHNICAL FIELD

The present disclosure generally relates to wireless communication, and more specifically to systems and methods for concurrent data and signaling methodology for WiMAX handover.

BACKGROUND

Therefore, there is a need in the art for methods and systems for concurrent data and signaling methodologies for WiMAX handover.

SUMMARY

Certain embodiments of the present disclosure provide a method for wireless communications by a serving base station. The method generally includes receiving a handover request message from a mobile station, and transmitting a parameter t to the mobile station to indicate a time to suspend a first set of one or more service flows between the serving base station and the mobile station during a handover procedure and continue data exchange between the mobile station and the serving base station for a second set of one or more service flows during the handover procedure.

Certain embodiments of the present disclosure provide a method for wireless communications by a mobile station. The method generally includes transmitting a handover request message to a serving base station, receiving a parameter t from the serving base station that indicates a time to suspend a first set of one or more service flows between the base station and the mobile station during a handover procedure and continue data exchange for a second set of one or more service flows between the mobile station and the serving base station during the handover procedure, suspending the first set of service flows during the handover procedure based on the parameter t, and continuing the handover procedure while continuing data exchange for the second set of one or more service flows.

Certain embodiments of the present disclosure provide an apparatus for wireless communications by a serving base station. The apparatus generally includes logic for receiving a handover request message from a mobile station, and logic for transmitting a parameter t to the mobile station to indicate a time to suspend a first set of one or more service flows between the serving base station and the mobile station during a handover procedure and continue data exchange between the mobile station and the serving base station for a second set of one or more service flows during the handover procedure.

Certain embodiments of the present disclosure provide an apparatus for wireless communications by a mobile station. The apparatus generally includes logic for transmitting a handover request message to a serving base station, logic for receiving a parameter t from the serving base station that indicates a time to suspend a first set of one or more service flows between the base station and the mobile station during a handover procedure and continue data exchange for a second set of one or more service flows between the mobile station and the serving base station during the handover procedure, logic for suspending the first set of service flows during the handover procedure based on the parameter t, and logic for continuing the handover procedure while continuing data exchange for the second set of one or more service flows.

Certain embodiments of the present disclosure provide an apparatus for wireless communications by a serving base station. The apparatus generally includes means for receiving a handover request message from a mobile station, and means for transmitting a parameter t to the mobile station to indicate a time to suspend a first set of one or more service flows between the serving base station and the mobile station during a handover procedure and continue data exchange between the mobile station and the serving base station for a second set of one or more service flows during the handover procedure.

Certain embodiments of the present disclosure provide an apparatus for wireless communications by a mobile station. The apparatus generally includes means for transmitting a handover request message to a serving base station, means for receiving a parameter t from the serving base station that indicates a time to suspend a first set of one or more service flows between the base station and the mobile station during a handover procedure and continue data exchange for a second set of one or more service flows between the mobile station and the serving base station during the handover procedure, means for suspending the first set of service flows during the handover procedure based on the parameter t, and means for continuing the handover procedure while continuing data exchange for the second set of one or more service flows.

Certain embodiments of the present disclosure provide a computer-program product for wireless communications by a serving base station, comprising a computer-readable medium having instructions stored thereon, the instructions being executable by one or more processors. The instructions generally include instructions for receiving a handover request message from a mobile station, and instructions for transmitting a parameter t to the mobile station to indicate a time to suspend a first set of one or more service flows between the serving base station and the mobile station during a handover procedure and continue data exchange between the mobile station and the serving base station for a second set of one or more service flows during the handover procedure.

Certain embodiments of the present disclosure provide a computer-program product for wireless communications by a mobile station, comprising a computer-readable medium having instructions stored thereon, the instructions being executable by one or more processors. The instructions generally include instructions for transmitting a handover request message to a serving base station, instructions for receiving a parameter t from the serving base station that indicates a time to suspend a first set of one or more service flows between the base station and the mobile station during a handover procedure and continue data exchange for a second set of one or more service flows between the mobile station and the serving base station during the handover procedure, instructions for suspending the first set of service flows during the handover procedure based on the parameter t, and instructions for continuing the handover procedure while continuing data exchange for the second set of one or more service flows.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

Certain embodiments are described herein with reference to the drawings, wherein like reference numerals are used to refer to like elements throughout. In the following description, for purposes of explanation, numerous specific details are set forth in order to provide a thorough understanding of certain embodiments. However, it may be that such embodiment(s) can be practiced without these specific details. In other instances, well-known structures and devices are shown in block diagram form in order to facilitate describing certain embodiments.

The word "exemplary" is used herein to mean "serving as an example, instance, or illustration." Any method, apparatus, feature, device, aspect, embodiment or design described herein as "exemplary" is not necessarily meant to be construed as preferred or as exclusive or preclusive of any other method, apparatus, feature, device, aspect, embodiment or design also described herein.

In a wireless communication system, a transmitter typically processes (e.g., encodes and symbol maps) traffic data to generate data symbols, which are modulation symbols for data. The transmitter then processes the data symbols to generate a modulated signal and transmits this signal via a wireless channel. The wireless channel distorts the transmitted signal with a channel response and further degrades the signal with noise and interference (all of which may be collectively referred to as "noise"). A receiver receives the transmitted signal and processes the received signal to obtain data symbol estimates, which are estimates of the transmitted data symbols. The receiver then processes (e.g., demodulates and decodes) the data symbol estimates to obtain decoded data.

Service flows are introduced in WiMAX as a mechanism for the logical channels to transfer data between the subscriber station's (SS's) side software (SW) applications and the network side (via a base station, BS) SW applications. Each service flow can be associated with a service flow ID (SFID). Several service flow channels may share one data transport connection ID (transport CID). During a handover (or handoff, HO) procedure (i.e., when the SS switches from the current, serving BS to another, target BS), the service flows do not necessarily have to be suspended or torn down in certain scenarios. In the current WiMAX standards, however, it is not well defined how this issue can be resolved; so users will either use a conservative way to handle this situation or they may lose a portion of data during the HO procedure.

Certain disclosed embodiments may be used in various wireless communication networks or mobile communications systems such as wireless wide area networks (WWANs), wireless metropolitan area networks (WMANs), wireless local area networks (WLANs), ultra mobile broadband (UMB), universal mobile telecommunications system (UMTS), UMTS long term evolution (LTE), and so on. The terms "network" and "system" are often used interchangeably. The techniques may also be used for various multiple access networks such as Frequency Division Multiple Access (FDMA), Code Division Multiple Access (CDMA), Wideband-CDMA, Time Division Multiple Access (TDMA), Spatial Division Multiple Access (SDMA), Orthogonal FDMA (OFDMA), Single-Carrier FDMA (SC-FDMA), and other such networks. An OFDMA network utilizes Orthogonal Frequency Division Multiplexing (OFDM).

Certain disclosed embodiments may also be used with various antenna arrangements such as single-input single-output (SISO), single-input multiple-output (SIMO), multiple-input single-output (MISO), and multiple-input multiple-output (MIMO) transmissions. Single-input refers to one transmit antenna and multiple-input refers to multiple transmit antennas for data transmission. Single-output refers to one receive antenna and multiple-output refers to multiple receive antennas for data reception.

The rapid growth in wireless internets and communications has led to an increasing demand for high data rate in the field of wireless communications services. OFDM/OFDMA systems are regarded as a promising research area and a possible technology for next generation wireless communications. This is because OFDM/OFDMA modulation schemes can provide many advantages like modulation efficiency, spectrum efficiency, flexibility, and strong multi-path immunity with a relatively simple equalizer over some single carrier modulation schemes.

Exemplary Wireless Communication System

Figure 1:
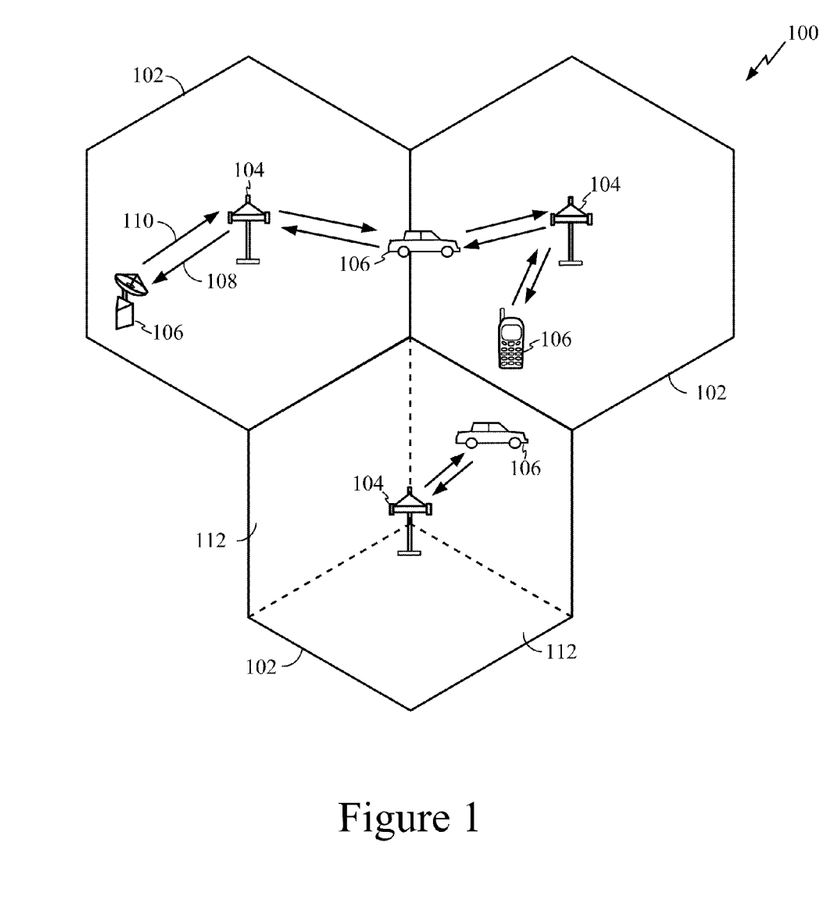
FIG. 1 illustrates an exemplary wireless communication system in accordance with certain embodiments set forth herein.

FIG. 1 illustrates an exemplary wireless communication system 100 in accordance with certain embodiments set forth herein. Wireless communication system 100 may be a broadband wireless communication system. The term "broadband wireless" refers to technology that at least provides wireless, audio, video, voice, Internet, and/or data network access. Wireless communication system 100 provides communication for one or more cells 102, each of which is serviced by a base station 104. Base station 104 may be a fixed station that communicates with user terminals 106 within cell 102 serviced by that base station 104. Base station 104 may alternatively be referred to as an access point, Node B or some other terminology.

As shown in FIG. 1, various user terminals 106 dispersed throughout wireless communication system 100. User terminals 106 may be fixed (i.e., stationary), mobile or capable of both. User terminals 106 may alternatively be referred to as remote stations, access terminals, terminals, subscriber units, mobile stations, stations, user equipment, subscriber stations and the like. User terminals 106 may be personal wireless devices, such as cellular phones, personal digital assistants (PDAs), handheld devices, wireless modems, audio/video players, laptop computers, personal computers, other handheld communication devices, other handheld computing devices, satellite radios, global positioning systems, and so on. A variety of algorithms and methods may be used for transmissions in wireless communication system 100 between base stations 104 and user terminals 106. For example, signals may be sent and received between base stations 104 and user terminals 106 in accordance with OFDM/OFDMA techniques. If this is the case, wireless communication system 100 may be referred to as an OFDM/OFDMA system 100.

A communication link that facilitates transmission from base station 104 to user terminal 106 may be referred to as a downlink 108, and a communication link that facilitates transmission from user terminal 106 to base station 104 may be referred to as an uplink 110. Alternatively, downlink 108 may be referred to as a forward link or a forward channel, and uplink 110 may be referred to as a reverse link or a reverse channel. Cell 102 may be divided into multiple sectors 112. Sector 112 is a physical coverage area within cell 102. Base stations 104 within an OFDM/OFDMA system 100 may utilize antennas that concentrate the flow of power within a particular sector 112 of the cell 102. Such antennas may be referred to as directional antennas.

In certain embodiments, system 100 can be a multiple-input multiple-output (MIMO) communication system. Further, system 100 can utilize substantially any type of duplex technique to divide communication channels (e.g., forward link 108, reverse link 110, etc.) such as FDD, TDD, and the like. The channels can be provided for transmitting control data between mobile devices 106 and respective base stations 104.

Figure 2:
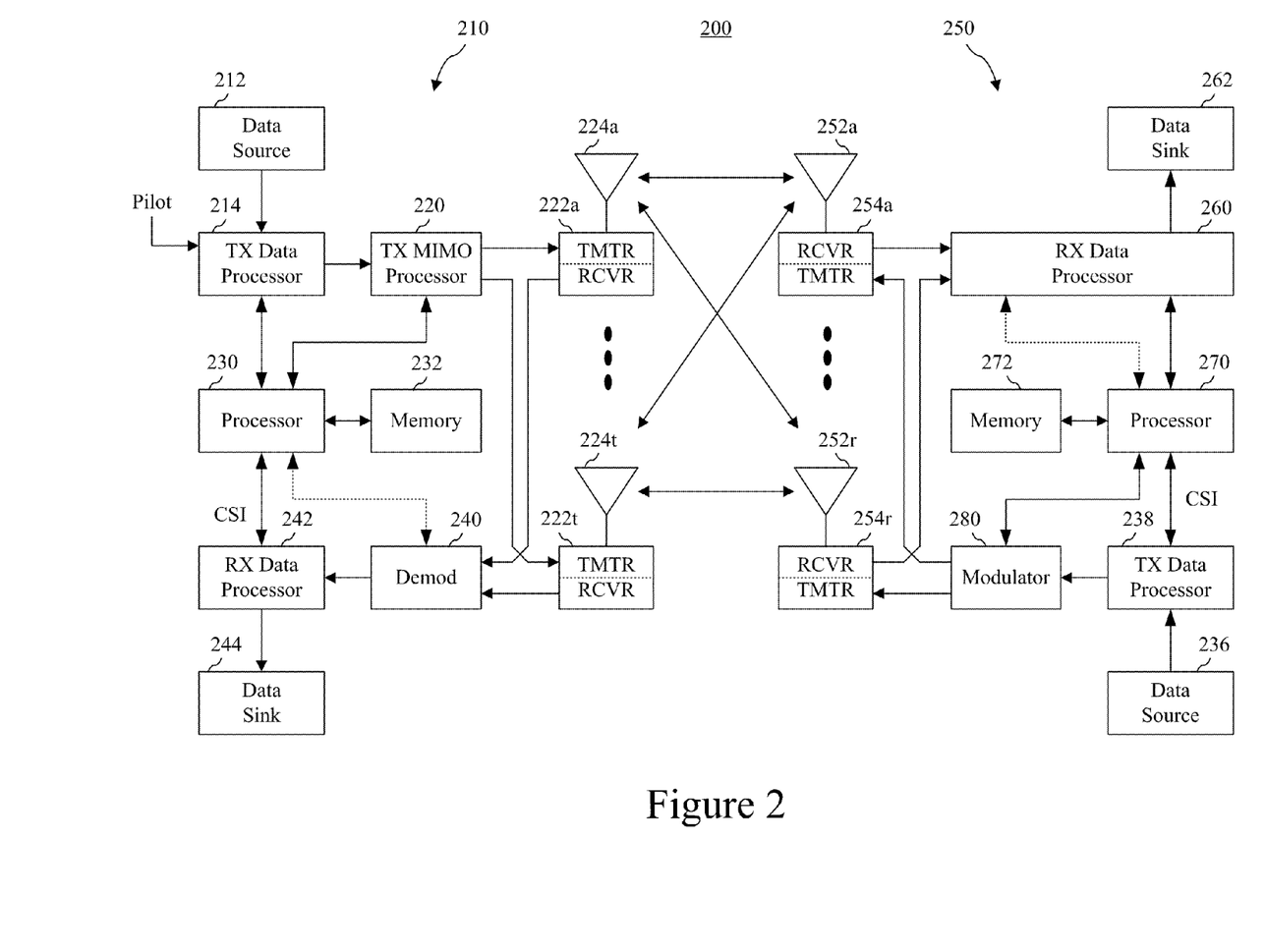
FIG. 2 illustrates an exemplary wireless network environment in accordance with certain embodiments set forth herein.

FIG. 2 illustrates an exemplary wireless network environment 200 in accordance with certain embodiments set forth herein. Wireless network environment 200 depicts one base station 210 and one mobile device 250 for sake of brevity. However, it is contemplated that system 200 can include one or more base stations and/or one or more mobile devices, wherein additional base stations and/or mobile devices can be substantially similar or different from illustrated base station 210 and illustrated mobile device 250 described herein. In addition, it is contemplated that base station 210 and/or mobile device 250 can employ the systems, techniques, configurations, embodiments, aspects, and/or methods described herein to facilitate wireless communication between them.

At base station 210, traffic data for a number of data streams is provided from a data source 212 to a transmit (TX) data processor 214. In certain embodiments, each data stream can be transmitted over a respective antenna and/or over multiple antennas. TX data processor 214 formats, codes, and interleaves the traffic data stream based on a particular coding scheme selected for that data stream to provide coded data.

The coded data for each data stream can, for example, be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 250 to estimate channel response or other communication parameters and/or characteristics. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides Nt modulation symbol streams to Nt transmitters (TMTR) 222a through 222t. In certain embodiments, TX MIMO processor 220 applies certain multi-antenna techniques, such spatial multiplexing, diversity coding or preceding (i.e., beamforming, with weights being applied to the modulation symbols of the data streams and to the antenna from which the symbol is being transmitted).

Each transmitter 222 receives and processes a respective modulation symbol stream to provide one or more analog signals, and further conditions (e.g., amplifies, filters, upconverts, etc.) the analog signals to provide a modulated signal suitable for transmission over the MIMO channel. Further, Nt modulated signals from transmitters 222a through 222t are transmitted from Nt antennas 224a through 224t, respectively.

At mobile device 250, the transmitted modulated signals are received by Nr antennas 252a through 252r and the received signal from each antenna 252 is provided to a respective receiver (RCVR) 254a through 254r. Each receiver 254 conditions (e.g., filters, amplifies, downconverts, etc.) a respective signal, digitizes the conditioned signal to provide samples, and further processes the samples to provide a corresponding "received" symbol stream.

A receive (RX) data processor 260 can receive and process the Nr received symbol streams from Nr receivers 254 based on a particular receiver processing technique to provide Nt "detected" symbol streams. RX data processor 260 can demodulate, deinterleave, decode, and etc. each detected symbol stream to recover the traffic data for the data stream, and provide the traffic data to a data sink 262. In certain embodiments, for mobile device 250, the processing by RX data processor 260 can be complementary to that performed by TX MIMO processor 220 and TX data processor 214 at base station 210.

A processor 270 can periodically determine which preceding matrix to utilize as discussed above. Further, processor 270 can formulate a reverse link message comprising a matrix index portion and a rank value portion. The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from mobile device 250 are received by Nt antennas 224, conditioned by respective Nt receivers 222, demodulated by a demodulator 240, and processed by a RX data processor 242 to extract the reverse link message transmitted by mobile device 250, and provide the reverse link message to a data sink 244. Further, processor 230 can process the extracted message to determine which preceding matrix to use for determining the beamforming weights.

Processors 230 and 270 can direct (e.g., control, coordinate, manage, etc.) operation at base station 210 and mobile device 250, respectively. Respective processors 230 and 270 can be associated with memory 232 and 272 that store program codes and data. Processors 230 and 270 can also perform computations to derive frequency and impulse response estimates for the uplink and downlink, respectively. All "processor" functions can be migrated between and among process modules such that certain processor modules may not be present in certain embodiments, or additional processor modules not illustrated herein may be present.

Memory 232 and 272 (as with all data stores disclosed herein) can be either volatile memory or nonvolatile memory or can include both volatile and nonvolatile portions, and can be fixed, removable or include both fixed and removable portions. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink™ DRAM (SLDRAM), and direct Rambus™ RAM (DRRAM). Memory 308 of the certain embodiments is intended to comprise, without being limited to, these and any other suitable types of memory.

Exemplary Concurrent Data and Signaling Methodology for WiMAX Handover

Service flows are introduced in WiMAX as a mechanism for the logical channels to transfer data between the subscriber station's (SS's) side software (SW) applications and the network side (via a base station, BS) SW applications. Each service flow can be associated with a service flow ID (SFID). Several service flow channels may share one data transport connection ID (transport CID). During a handover (or handoff, HO) procedure (i.e., when the subscriber station or the mobile station switches from the current, serving BS to another, target BS), the service flows do not necessarily have to be suspended or torn down in certain scenarios. In the current WiMAX standards, however, it is not well defined how this issue can be resolved; so users may either use a conservative way to handle this situation or they may lose a portion of data during the HO procedure.

During the WiMAX registration procedure (e.g., REG-REQ, REG-RSP, etc.), a subscriber station (SS) can specify whether it can (or wants to) support ARQ (e.g., automatic repeat-request, automatic retransmit-request, automatic retransmission-request, etc.). If the SS ARQ support is set to yes, and the base station (BS) allows the SS to use ARQ in reply, then the media access control (MAC) layer can perform the ARQ operation for the connection that is created with ARQ enabled during Dynamic Service Add (DSA). Otherwise, ARQ protocol is not activated in the transport channel. With ARQ protocol activated, the SS is able to request the BS to retransmit any missing data or data in error.

For certain aspects of the present disclosure, some service flows such as the ones that support ARQ do not necessarily need to be suspended during a WiMAX handover (HO) procedure, whereas, other service flows need to be suspended during the HO procedure, such as the service flows that do not support ARQ. This application further discloses one or more ways to allow the data transfer to be proceeded during the HO procedure between a SS and the current BS to increase the data transfer throughput as shown in FIG. 5A.

Figure 3:
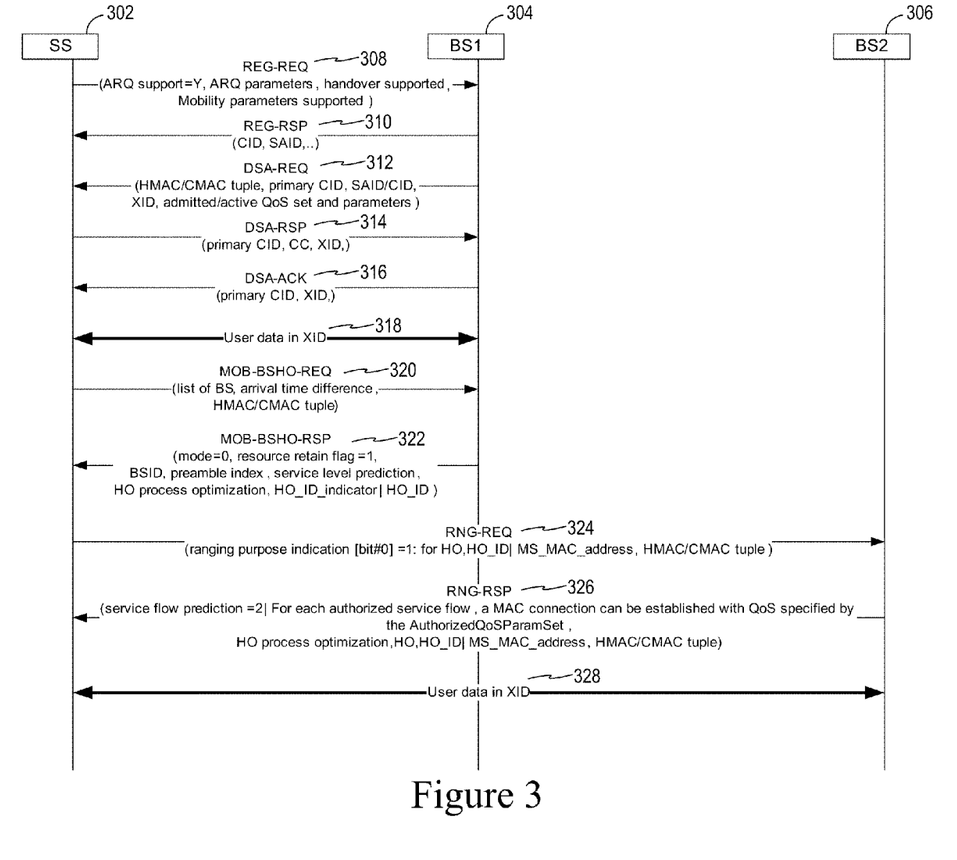
FIG. 3 illustrates an exemplary ARQ-based service flow for handover procedure in accordance with certain embodiments as set forth herein.
Figure 3A:
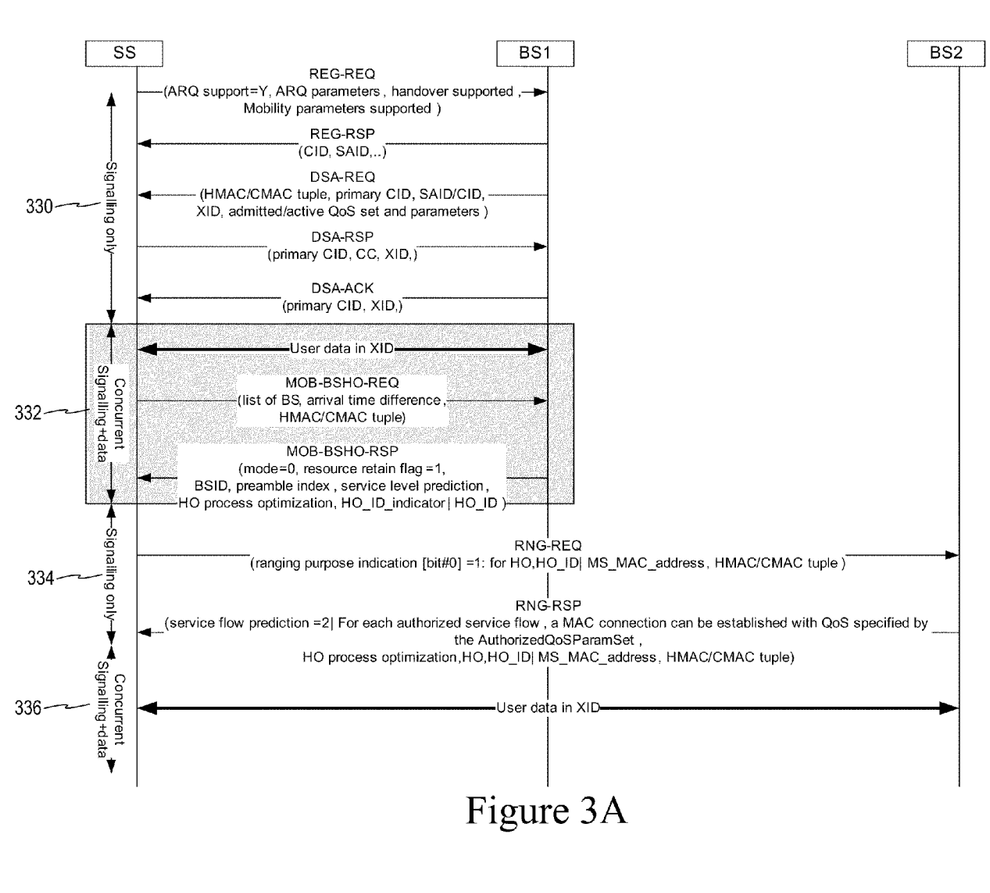
FIG. 3A illustrates an exemplary ARQ-based concurrent signaling and data transfer model for handover procedure in accordance with certain embodiments as set forth herein.
Figure 4:
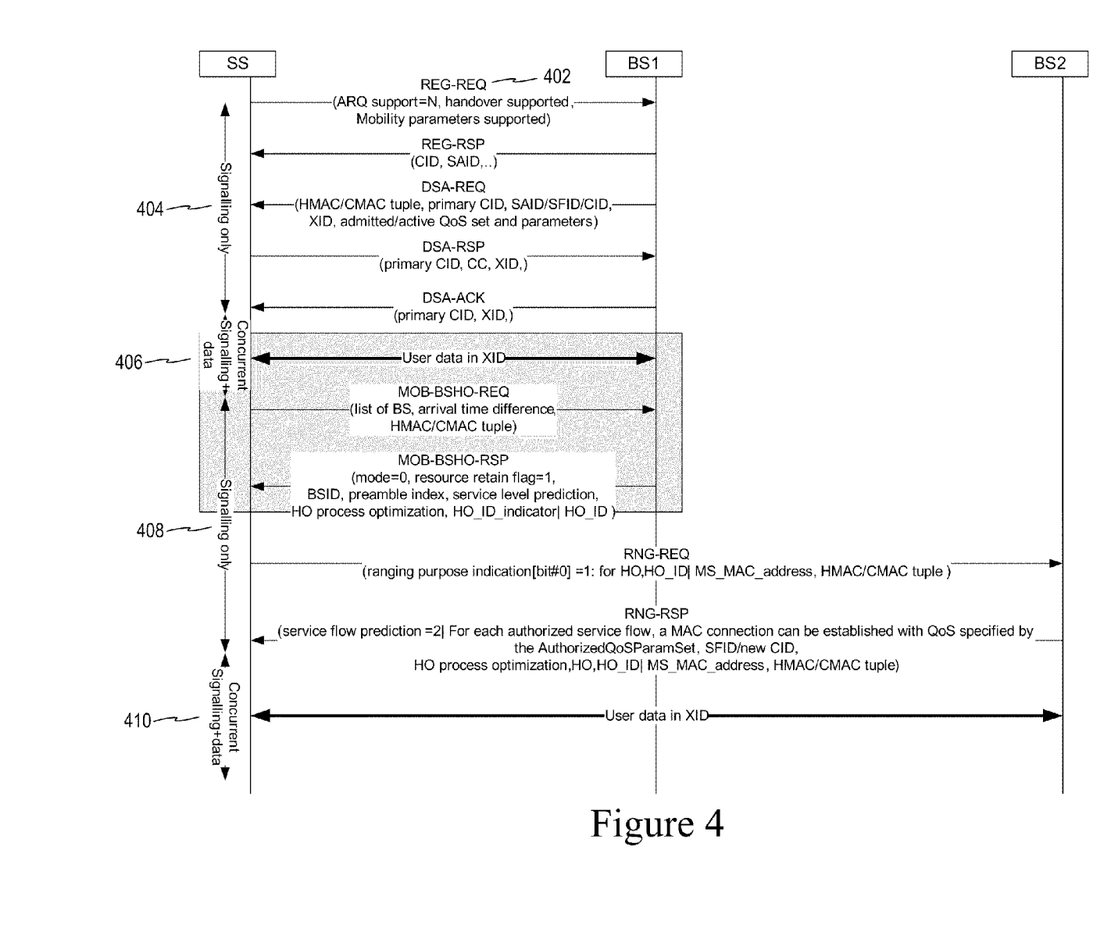
FIG. 4 illustrates an exemplary non-ARQ-based concurrent signaling and data transfer model for handover procedure in accordance with certain embodiments as set forth herein.
Figure 4A:
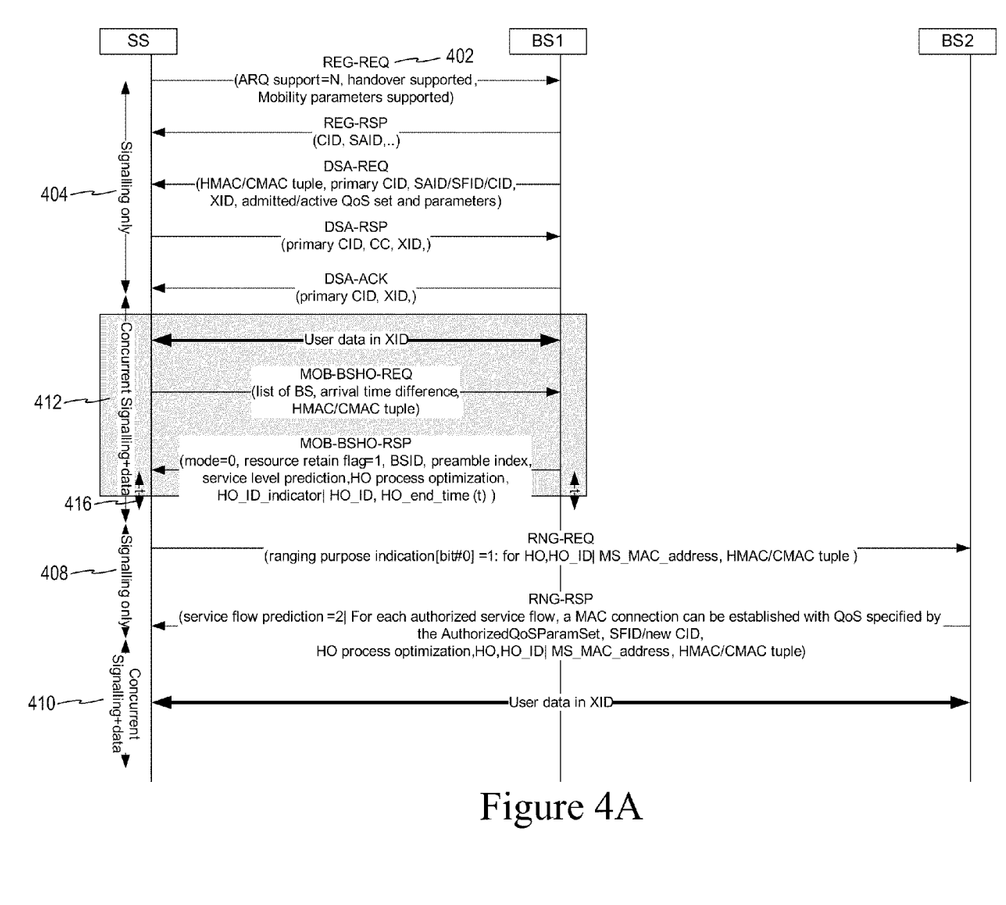
FIG. 4A illustrates an exemplary non-ARQ-based concurrent signaling and data transfer model using HO_end_time(t) approach for HO procedure to increase the concurrent signaling and data duration in accordance with certain embodiments as set forth herein.

During the WiMAX HO procedure, the current standards do not specify when a particular on-going service flow between a SS and the serving BS should be suspended or torn down. In some scenarios, as depicted in FIGS. 3-3A, the service flows can be implicitly maintained during the HO procedure (i.e., which means that it may not be necessary to suspend the data transfer before the HO procedure starts). In some other scenarios as depicted in FIGS. 4-4A, there is no guarantee that the service flows can be implicitly maintained during the HO procedure (i.e., which means that it may be better to suspend the data transfer before the HO procedure starts). Since the duration of the HO procedure between a SS and the current BS (i.e., serving BS) could extend to 100 ms or more, for the non-ARQ supported service flows, it is possible to introduce a new parameter inside the mobile base station handover response (MOB-MS/BSHO-RSP) message to indicate when the serving BS (i.e., current BS) will suspend the non-ARQ supported service flows, as shown in FIG. 4B.

FIG. 3 illustrates an exemplary ARQ-based service flow for a handover of a subscriber station (SS) 302 from a serving base station (BS1) 302 to a target base station (BS2) 306, in accordance with certain embodiments of the present disclosure. The SS sends a registration request message (REG-REQ) 308 to the serving base station. The REG-REQ message may indicate a plurality of settings and parameters such as ARQ-support='yes', ARQ parameters, handover supported, mobility parameters supported. The serving base station 304 may send a registration response (REG-RSP) message 310 containing connection identification (CID), SAID and other parameters to the SS.

In addition, the serving base station sends a dynamic service addition request (DSA-REQ) message 312 to the SS that may contain HMAC/CMAC tuple, primary CID, SAID/CID, XID, admitted/active QoS set and parameters. The SS sends a dynamic service addition response (DSA-RSP) 314 to the serving base station including the primary CID, CC, XID. The serving base station sends an acknowledgement message (DSA-ACK) 316 including the primary CID, XID. The user data is then exchanged between the SS and the serving BS.

When the SS needs to handover to a target base station, the SS sends a mobility base station handover required (MOB-BSHO-REQ) message 320 to the serving base station. The SS includes a list of neighboring base stations, the message arrival time difference between the base stations, and HMAC/CMAC tuple in the MOB-BSHO-REQ message. The serving base station replies with a mobility base station handover response (MOB-BSHO-RSP) message 322 that may include the following settings and fields: mode=0, resource retain flag=1, BSID, preamble index, service level prediction, handover process optimization, handover identification indicator (HO-ID-indicator), handover identification (HO-ID).

Upon receiving the MOB-BSHO-RSP message from the serving base station, the SS starts communicating with the target base station 306 by sending a ranging request (RNG-REQ) 324 message to the target BS that may include a ranging purpose indication [bit#0]=1, for HO, HO_ID, the media access control (MAC address of the SS (MS_MAC_address), HMAC/CMAC tuple. The target base station responds with a ranging response (RNG-RSP) message 326 that may include a serving flow prediction field=2 for each authorized service flow. A MAC connection can be established with QoS specified by handover process optimization. The RNG-RSP message may also include HO, HO_ID, MS_MAC_Address and HMAC/CMAC tuple fields. After successful completion of the ranging procedure, the SS and the target base station start transmitting/receiving the user data in XID 328.

FIG. 3A illustrates an exemplary ARQ-based concurrent signaling and data transfer model for handover procedure in accordance with certain embodiments of the present disclosure. As illustrated, during the time duration 330, only signaling messages are exchanged between the SS and the serving base station (BS1). During time duration 332, marked with a grayed box, signaling messages are transmitted/received concurrently with data packets. Since the connection between the SS and the serving base station is still valid while the SS request for a handover to a target BS. During the time duration 334, the SS only exchanges control signals with the target base station to perform ranging procedure. When the ranging procedure is finished, the MS starts transmitting/receiving data to/from the target base station. During this time the data and the control signals 336 may be transmitted/received concurrently. The rest of FIG. 3A, not explicitly described here, is similar to FIG. 3.

FIG. 4 illustrates an exemplary non-ARQ-based concurrent signaling and data transfer model for handover procedure in accordance with certain embodiments of the present disclosure. Most of the signals in FIG. 4 are similar to the signals in FIGS. 3 and 3A. The main difference between FIGS. 3 and 4 is whether or not ARQ is supported for the service flow between the SS and the serving BS. As illustrated in FIG. 4, when the SS sends a REG-REQ message 402 to the serving base station, the SS indicates that ARQ is not supported (i.e., ARQ support=No in REG-REQ message). In this figure, only the control signals are exchanged between the SS and the serving base station during time duration 404. Since ARQ is not supported, the time duration 406 in which concurrent signaling and data transfer happens is much shorter that the corresponding time duration 332 in FIG. 3A. As a result, the time duration 408 dedicated to 'signaling only' is longer than the corresponding time duration 334 in FIG. 3A. In the time duration 410, both control signals and data packets may be exchanged between the SS and the target base station (BS2).

For certain aspects of the present disclosure, the time duration for concurrent signaling and data transfer, in which a SS continues to exchange data packets with a serving base station while requesting a handover to a target base station may be increased by transmitting a parameter t from the serving base station to the SS. The parameter t may indicate the ending time of the handover procedure (i.e., HO_end_time(t)). The HO_end_time(t) shows the amount of time after reception of the MOB-BSHO-RSP message from the serving base station that the SS should stop exchanging data packets with the serving base station in certain data flows.

FIG. 4A illustrates an exemplary non-ARQ-based concurrent signaling and data transfer model using HO_end_time(t) approach for HO procedure to increase the concurrent signaling and data transmission duration in accordance with certain embodiments of the present disclosure. Comparing the time duration 406 in FIG. 4 with the time duration 412 shown in FIG. 4A indicates that the SS may continue the data exchange with the serving base station for a longer duration in FIG. 4A compared to FIG. 4, therefore, the user may maintain higher data rate in FIG. 4 while performing a handover.

Figure 5:
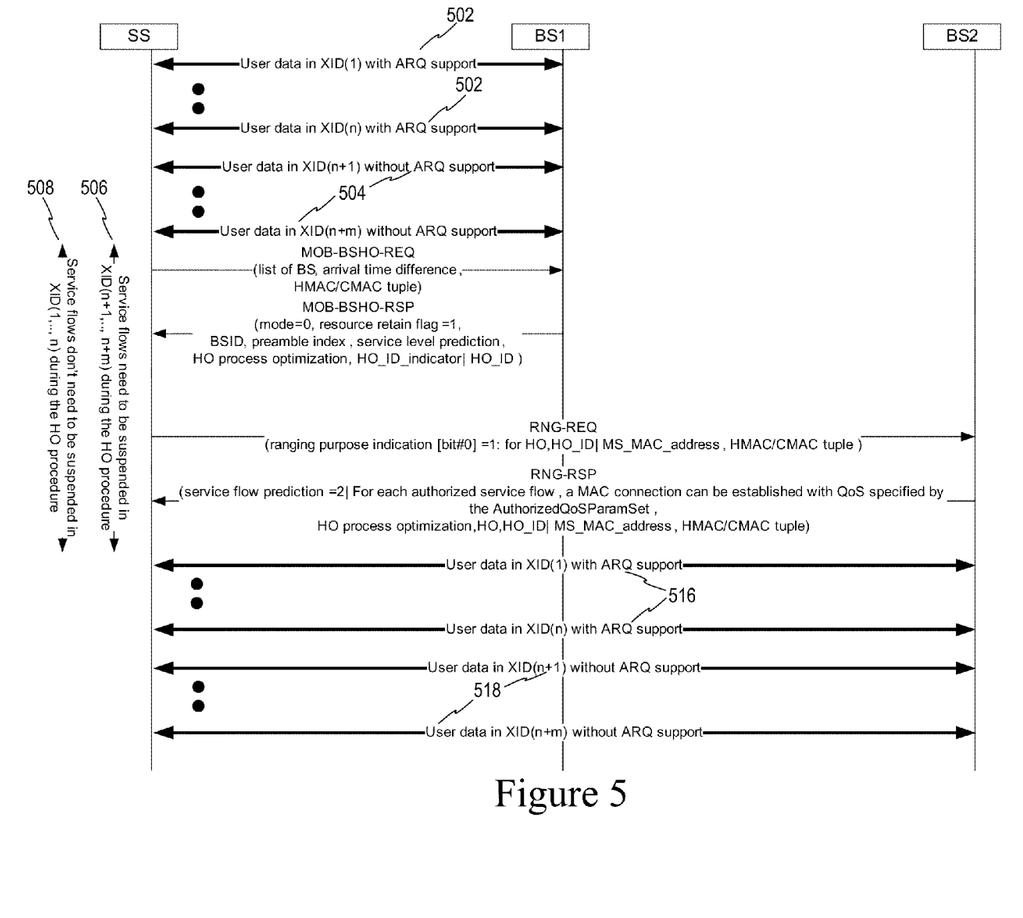
FIG. 5 illustrates an example of a handover procedure in which a plurality of ARQ-based and non-ARQ-based service flows exist between a subscriber station and a serving base station, in accordance with certain embodiments of the present disclosure.
Figure 5A:
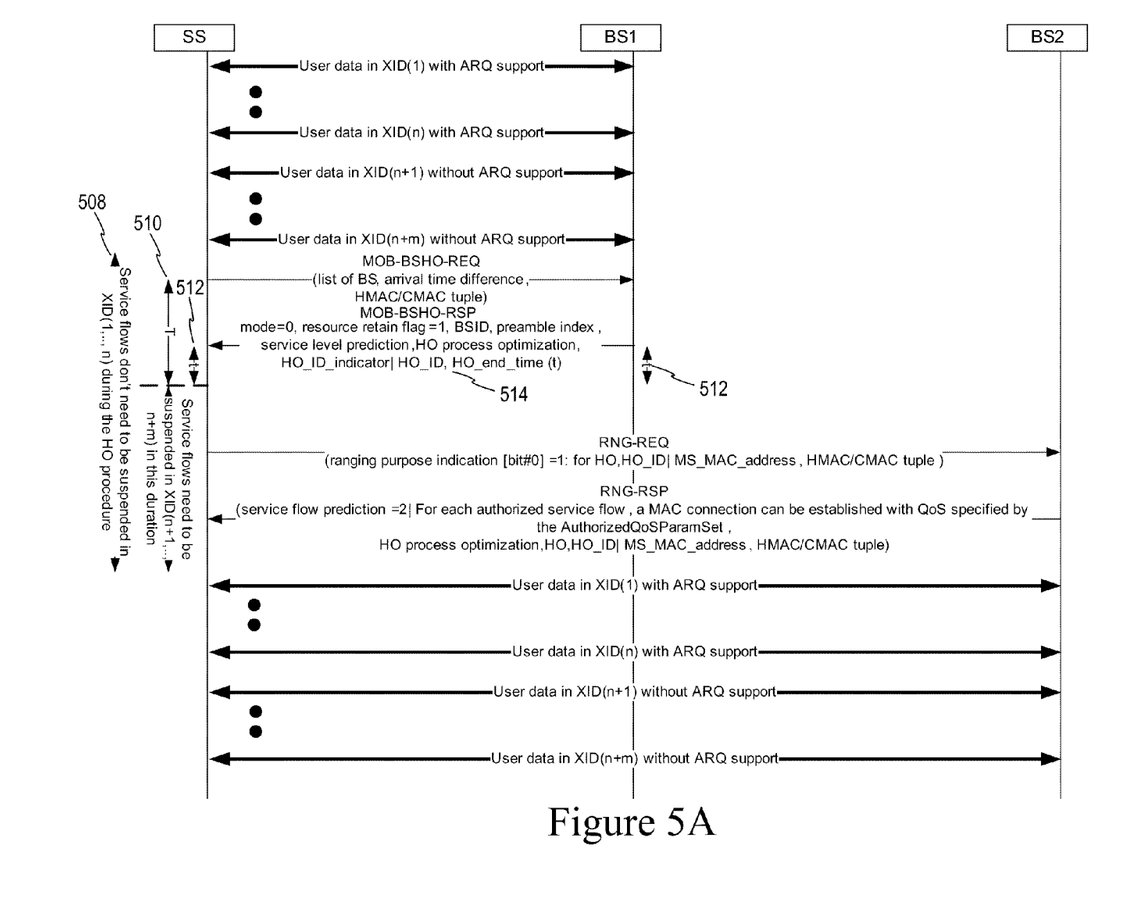
FIG. 5A illustrates the proposed technique to decrease the time duration in which some service flows are suspended during the HO procedure, in accordance with certain embodiments of the present disclosure.

Since multiple service flows may exist between a SS and a BS, and some (i.e., from none to all) of the service flows may be supported by the ARQ protocol (but not others), the SS should suspend those non-ARQ supported service flows during the HO procedure if the network can transport the current service flow configurations from the current serving BS to the target BS, as shown in FIG. 5. Otherwise, the network should provide a new parameter to explicitly specify when to suspend the current service flows either non-ARQ based service flow or for both ARQ and non-ARQ based service flows between a SS and a BS, as shown in FIG. 5A.

FIG. 5 illustrates an example of a handover procedure in which a plurality service flows exist between a subscriber station and a serving base station, in accordance with certain embodiments of the present disclosure. As illustrated, the service flows from 1 to n 502 support ARQ and service flows from n+1 through n+m do not support ARQ 504. As a result, the service flows n+1 through n+m may need to be suspended during handover procedure, whereas the service flows 1 through n may continue 508 while the SS performs a handover from the serving BS (BS1) to the target BS (BS2). After handover procedure is completed, the SS may continue the data exchange for all the data flows 1 through n+m with the target base station (516, 518).

FIG. 5A illustrates the proposed technique to decrease the time duration in which some service flows are suspended during the handover procedure, in accordance with certain embodiments of the present disclosure. Similar to FIG. 5, the service flows 1 through n 508 may continue during the handover procedure. As illustrated in FIG. 5A, a new field HO_end_time(t) may be introduced in the MOB-BSHO-RSP message that indicates the time t 512 after reception of the MOB-BSHO-RSP message that the service flows n+1 to n+m should be suspended. This scheme increases the time duration in which the service flows n+1 to n+m continue exchanging data with the serving base station by T 510 during handover, procedure. As a result, the performance of the system may be increased.

This disclosure is presented to clarify the service flow suspension and non-suspension scenarios during the WiMAX handover procedure. In addition, the present disclosure proposes a method to decrease the time the service flows are suspended during the handover procedure.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is contemplated that certain embodiments described herein can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein can be implemented with modules, instructions/codes, or set(s) of instructions/codes (e.g., procedures, functions, and so on) that perform the functions described herein. The memory unit can be implemented within the processor or be external to the processor (or both), in which case it can be communicatively coupled to the processor via various means as known in the art. The firmware and/or software instructions/codes may be stored in one or more memories (e.g., memory 232 and 272 in FIG. 2) and executed by one or more processors (e.g., processor 230 and 270 in FIG. 2). The memory may be implemented within the processor or external to the processor.

When certain embodiments are implemented in software, firmware, middleware or microcode, program code or code segments, they can be stored in a machine-readable medium or storage medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

If implemented in software, certain embodiments may be stored on or transmitted over as instructions or codes, or as one or more sets of instructions or code on a computer-readable medium or storage medium. Computer-readable media includes both computer storage media and communication media including any medium that facilitates transfer of a computer program from one place to another. A storage media may be any available media that can be accessed by a computer or by one or more processing devices. For example, and which limitation, computer-readable media can include RAM, ROM, EEPROM, magnetic storage devices (e.g., hard disk, floppy disk, magnetic strips, etc.), optical disks (e.g., compact disk (CD), digital versatile disk (DVD), etc.), smart cards, flash memory devices (e.g., card, stick, key drive, etc.), or any other medium that can be used to carry, store or transfer desired program code in the form of instructions or data structures and that can be accessed by the device on which it is meant to be read or transferred. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes but is not limited to compact disc (CD), laser disc, optical disc, digital versatile disc (DVD), floppy disk and Blu-ray™ disc, where disks usually reproduce data magnetically, while discs reproduce data optically with lasers. Combinations of the above should also be included within the scope of computer-readable media.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

While the foregoing is directed to embodiments of the present invention, other and further embodiments of the invention may be devised without departing from the basic scope thereof, and the scope thereof is determined by the claims that follow.

What is claimed is:

1. A method for wireless communications by a serving base station, comprising:
   receiving a handover request message from a mobile station; and
   transmitting a parameter t to the mobile station to indicate a time to suspend a first set of one or more service flows between the serving base station and the mobile station during a handover procedure and continue data exchange between the mobile station and the serving base station for a second set of one or more service flows during the handover procedure, wherein the first set of one or more service flows does not support Automatic Repeat Requests (ARQ) in a media access control (MAC) layer and wherein the second set of one or more service flows supports ARQ in a MAC layer.

2. The method of claim 1, wherein support for ARQ is indicated in a registration request (REG-REQ) message.

3. The method of claim 1, wherein the parameter t is transmitted to the mobile station as a new field in a handover response message.

4. The method of claim 1, wherein the parameter t indicates a relative time after reception of the parameter t to suspend the service flows of the first set of service flows between the mobile station and the base station.

5. A method for wireless communications by a mobile station, comprising:
   transmitting a handover request message to a serving base station;
   receiving a parameter t from the serving base station that indicates a time to suspend a first set of one or more service flows between the serving base station and the mobile station during a handover procedure and continue data exchange for a second set of one or more service flows between the mobile station and the serving base station during the handover procedure;
   suspending the first set of one or more service flows during the handover procedure based on the parameter t, wherein the first set of one or more service flows does not support Automatic Repeat Request (ARQ) in a media access control (MAC) layer; and
   continuing the handover procedure while continuing data exchange for the second set of one or more service flows, wherein the second set of one or more service flows supports ARQ in a MAC layer.

6. The method of claim 5, wherein the support for ARQ is indicated in a registration request (REG-REQ) message.

7. The method of claim 5, wherein the parameter t indicates a relative time after reception of the parameter t to suspend the service flows of the first set of service flows between the mobile station and the base station.

8. An apparatus for wireless communications by a serving base station, comprising:
   one or more processors configured to:
      receive a handover request message from a mobile station; and
      transmit a parameter t to the mobile station to indicate a time to suspend a first set of one or more service flows between the serving base station and the mobile station during a handover procedure and continue data exchange between the mobile station and the serving base station for a second set of one or more service flows during the handover procedure, wherein the first set of one or more service flows does not support Automatic Repeat Requests (ARQ) in a media access control (MAC) layer and wherein the second set of one or more service flows supports ARQ in a MAC layer; and a memory coupled to the one or more processors.

9. The apparatus of claim 8, wherein support for ARQ is indicated in a registration request (REG-REQ) message.

10. The apparatus of claim 8, wherein the parameter t is transmitted to the mobile station as a new field in a handover response message.

11. The apparatus of claim 8, wherein the parameter t indicates a relative time after reception of the parameter t to suspend the service flows of the first set of service flows between the mobile station and the base station.

12. An apparatus for wireless communications by a mobile station, comprising:

one or more processors configured to:
    transmit a handover request message to a serving base station;
    receive a parameter t from the serving base station that indicates a time to suspend a first set of one or more service flows between the serving base station and the mobile station during a handover procedure and continue data exchange for a second set of one or more service flows between the mobile station and the serving base station during the handover procedure;
    suspend the first set of one or more service flows during the handover procedure based on the parameter t, wherein the first set of one or more service flows does not support Automatic Repeat Request (ARQ) in a media access control (MAC) layer; and
    continue the handover procedure while continuing data exchange for the second set of one or more service flows, wherein the second set of one or more service flows supports ARQ in a MAC layer; and
a memory coupled to the one or more processors.

13. The apparatus of claim 12, wherein the support for ARQ is indicated in a registration request (REG-REQ) message.

14. The apparatus of claim 12, wherein the parameter t indicates a relative time after reception of the parameter t to suspend the service flows of the first set of service flows between the mobile station and the base station.

15. An apparatus for wireless communications by a serving base station, comprising:

means for receiving a handover request message from a mobile station; and
means for transmitting a parameter t to the mobile station to indicate a time to suspend a first set of one or more service flows between the serving base station and the mobile station during a handover procedure and continue data exchange between the mobile station and the serving base station for a second set of one or more service flows during the handover procedure, wherein the first set of one or more service flows does not support Automatic Repeat Requests (ARQ) in a media access control (MAC) layer and wherein the second set of one or more service flows supports ARQ in a MAC layer.

16. The apparatus of claim 15, wherein support for ARQ is indicated in a registration request (REG-REQ) message.

17. The apparatus of claim 15, wherein the parameter t is transmitted to the mobile station as a new field in a handover response message.

18. The apparatus of claim 15, wherein the parameter t indicates a relative time after reception of the parameter t to suspend the service flows of the first set of service flows between the mobile station and the base station.

19. An apparatus for wireless communications by a mobile station, comprising:

means for transmitting a handover request message to a serving base station;
means for receiving a parameter t from the serving base station that indicates a time to suspend a first set of one or more service flows between the serving base station and the mobile station during a handover procedure and continue data exchange for a second set of one or more service flows between the mobile station and the serving base station during the handover procedure;
means for suspending the first set of one or more service flows during the handover procedure based on the parameter t, wherein the first set of one or more service flows does not support Automatic Repeat Request (ARQ) in a media access control (MAC) layer; and
means for continuing the handover procedure while continuing data exchange for the second set of one or more service flows, wherein the second set of one or more service flows supports ARQ in a MAC layer.

20. The apparatus of claim 19, wherein the support for ARQ is indicated in a registration request (REG-REQ) message.

21. The apparatus of claim 19, wherein the parameter t indicates a relative time after reception of the parameter t to suspend the service flows of the first set of service flows between the mobile station and the base station.

22. A non-transitory computer-readable medium for wireless communications by a serving base station, the non-transitory computer-readable medium having instructions stored thereon, the instructions being executable by one or more processors and the instructions comprising:

instructions for receiving a handover request message from a mobile station; and
instructions for transmitting a parameter t to the mobile station to indicate a time to suspend a first set of one or more service flows between the serving base station and the mobile station during a handover procedure and continue data exchange between the mobile station and the serving base station for a second set of one or more service flows during the handover procedure, wherein the first set of one or more service flows does not support Automatic Repeat Requests (ARQ) in a media access control (MAC) layer and wherein the second set of one or more service flows supports ARQ in a MAC layer.

23. The non-transitory computer-readable medium of claim 22, wherein support for ARQ is indicated in a registration request (REG-REQ) message.

24. The non-transitory computer-readable medium of claim 22, wherein the parameter t is transmitted to the mobile station as a new field in a handover response message.

25. The non-transitory computer-readable medium of claim 22, wherein the parameter t indicates a relative time after reception of the parameter t to suspend the service flows of the first set of service flows between the mobile station and the base station.

26. A non-transitory computer-readable medium for wireless communications by a mobile station, the non-transitory computer-readable medium having instructions stored thereon, the instructions being executable by one or more processors and the instructions comprising:

instructions for transmitting a handover request message to a serving base station;

instructions for receiving a parameter t from the serving base station that indicates a time to suspend a first set of one or more service flows between the serving base station and the mobile station during a handover procedure and continue data exchange for a second set of one or more service flows between the mobile station and the serving base station during the handover procedure;

instructions for suspending the first set of one or more service flows during the handover procedure based on the parameter t, wherein the first set of one or more service flows does not support Automatic Repeat Request (ARQ) in a media access control (MAC) layer; and instructions for continuing the handover procedure while continuing data exchange for the second set of one or more service flows, wherein the second set of one or more service flows supports ARQ in a MAC layer.

27. The non-transitory computer-readable medium of claim 26, wherein the support for ARQ is indicated in a registration request (REG-REQ) message.

28. The non-transitory computer-readable medium of claim 26, wherein the parameter t indicates a relative time after reception of the parameter t to suspend the service flows of the first set of service flows between the mobile station and the base station.

* * * * *